United States Patent [19]

Nagashima

[11] Patent Number: 5,463,645
[45] Date of Patent: Oct. 31, 1995

[54] SYSTEM FOR DETECTING NON-COINCIDENCE OF CODES

[75] Inventor: Noriaki Nagashima, Tokyo, Japan

[73] Assignee: NEC Corporation, Tokyo, Japan

[21] Appl. No.: 80,083

[22] Filed: Jun. 21, 1993

[30] Foreign Application Priority Data

Jun. 19, 1992 [JP] Japan ................................. 4-161489

[51] Int. Cl.⁶ .................................................. H04L 7/10
[52] U.S. Cl. .................. 371/67.1; 340/146.2; 370/105.1; 370/105.4; 375/368
[58] Field of Search .................... 371/67.1, 68.1, 371/68.2, 69.1, 37.1, 42; 364/715.11, 728.03, 728.06, 769; 340/146.2; 375/116, 368; 370/105.4, 105.1, 105.2

[56] References Cited

U.S. PATENT DOCUMENTS

| | | | |
|---|---|---|---|
| 4,447,903 | 5/1984 | Sewerinson | 371/68 |
| 4,649,543 | 3/1987 | Levine | 371/41 |
| 5,073,932 | 12/1991 | Yossifor et al. | 380/23 |
| 5,218,562 | 6/1993 | Basehore et al. | 364/728.03 |

FOREIGN PATENT DOCUMENTS 0463752  1/1992  European Pat. Off. .

OTHER PUBLICATIONS

Patent Abstracts of Japan, vol. 5, No. 163, Oct. 1981.
P. L. O'Leary, "10–MHz 64–bit Error–Tolerant Signature Recognition Circuit", IEEE Journal of Solid–State Circuits, vol. 23, No. 3, Jun. 1988, pp. 625–629.
Electronics International, vol. 53, No. 23, Oct. 1980, New York, p. 260.

*Primary Examiner*—Stephen M. Baker
*Attorney, Agent, or Firm*—Sughrue, Mion, Zinn, Macpeak & Seas

[57] ABSTRACT

An input coded signal is compared with a predetermined coded signal to generate a non-coincidence signal. Error bits of the non-coincidence signal are changed to correct bits by a predetermined number of bits. When the non-coincidence signal has no longer any error bits as a result of changing the error bits to the correct bits, the input coded signal is determined to be correct.

5 Claims, 7 Drawing Sheets

SYSTEM FOR DETECTING NON-COINCIDENCE OF CODES

FIELD OF THE INVENTION

This invention relates to a system for detecting non-coincidence of code, and, more particularly, to a system which determines whether the number of error bits of a coded signal is less than or equal to a tolerable number.

BACKGROUND OF THE INVENTION

One type of a conventional system for detecting non-coincidence of codes, which may be used in a cordless telephone system, includes a circuit for detecting non-coincidence between corresponding bits of an input coded signal and a predetermined coded signal, a shift register for storing the results of the non-coincidence detection for each bit of the input coded signal, and a counter for counting the number of bits which are determined not to coincide.

In operation, the bits of the input coded signal are compared in the non-coincidence detecting circuit with corresponding bits of the predetermined coded signal, and the detected results, in the form of high and low level signals, are generated in accordance with the non-coincidence and the coincidence between corresponding bits of the input and predetermined coded signals. The high and low level signals are stored in the shift register, and supplied in series to one inputs of an AND gate pulses are supplied to the other input of the AND gate for permitting clock signals to be supplied to the counter so that the number of the high level signals can be counted. When the counted number is less than or equal to a predetermined tolerable number, the input coded signal is determined to be correct, even if the input coded signal includes errors in some bits.

Another type of conventional system for detecting non-coincidence of codes includes a predetermined number of circuits each determining whether coincidence exists between an input coded signal and one of a plurality of predetermined coded signals, wherein the predetermined number of circuits is determined by a bit error tolerable number, and each possible error coded signals which contains a number of errors which is not greater than the error tolerable number for an input coded signal as supplied to the corresponding coincidence detecting circuits.

In operation, the input coded signal is supplied to the coincidence detecting circuits, and compared therein with the each of the acceptable error coded signals. If any one of the coincidence detecting circuits generates a high level signal representing the coincidence between the input coded signal and one of the acceptable error coded signals, the input coded signal is determined to be acceptable.

However, there are disadvantages in the conventional systems for detecting non-coincidence of codes in that:

(1) the detection takes a long time in the former system because the detected results are supplied in series from the shift register to the AND gate. However, an advantage is that the scale of the system is relatively small, and (2) the size of the latter system becomes large because the bit error tolerable number can require a large number of coincidence detecting circuits to be provided. However, an advantage is that the detection is carried out in a short time.

SUMMARY OF THE INVENTION

Accordingly, it is an object of the invention to provide a system for detecting non-coincidence of cods in which a time for detecting the non-coincidence between corresponding bits of an input coded signal and a predetermined coded signal is short.

It is a further object of the invention to provide a system for detecting non-coincidence of codes in which the scale of system is not required to be large in order to realize a short detecting time.

According to the invention, a system for detecting non-coincidence of codes, comprises:

means for comparing an input coded signal and a predetermined coded signal to generate a non-coincidence signal including correct an error bits;

means for changing the error bits to correct bits in the non-coincidence signal by a predetermined number of bits, thereby generating a error bit decreased signal; and means for detecting coincidence between the input coded signal and the predetermined coded signal by checking existence of an error bit in the error bit decreased signal.

BRIEF DESCRIPTION OF THE DRAWINGS

The invention will be described in more detail in conjunction with appended drawings, wherein.

DESCRIPTION OF THE PREFERRED EMBODIMENTS

Before describing a system for detecting non-coincidence of codes in a preferred embodiment according to the invention, the aforementioned conventional systems will be explained in FIGS. 1 and 2.

Figure 1:
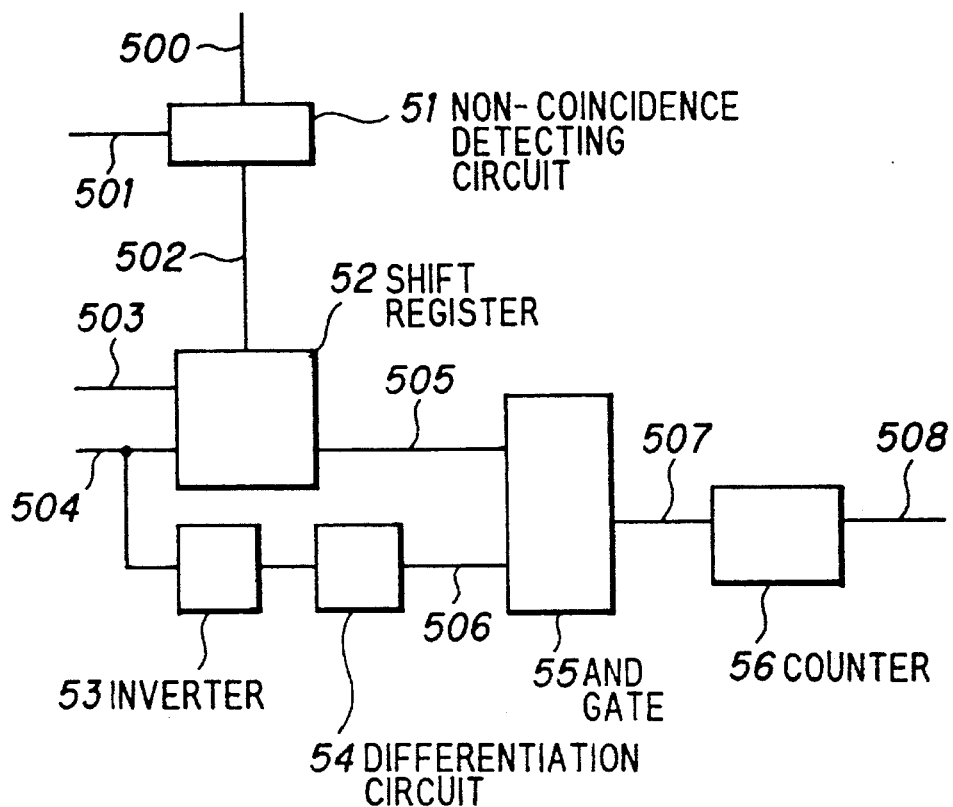
FIGS. 1 and 2 are block diagrams showing two types of conventional systems for detecting non-coincidence of codes.

FIG. 1 shows the former conventional system which includes a non-coincidence detecting circuit 51, a shift register 52, an inverter 53, a differentiation circuit 54, an AND gate 55, and a counter 56.

In operation, a predetermined (correct or reference) coded signal 500 and an input coded signal 501 are supplied to the non-coincidence detecting circuit 51. In the non-coincidence detecting circuit 51, an exclusive NOR process is carried out between each two corresponding bits of the input and predetermined coded signals, so that a high level signal is generated when the two bits coincide and a low level signal is generated when the two bits do not coincide. The high and low level signals are transferred via a signal line 502 to the shift register 52 in accordance with a load enable signal supplied via a control line 503. The shift register 52 supplies the AND gate 55 with the high and low level signals in series via a signal line 504 in accordance with a clock signal supplied via a clock line 504. The clock signal is inverted in the invertor 53, and the inverted signal is differentiated in the differentiation circuit 54 so that a pulse signal is supplied to the AND gate 55 via the signal line 506. Thus, when the high level signal is supplied from the shift register 52 to the AND gate 55, the pulse signal is supplied to the counter 56 via the AND gate 55 and a signal line 507 to be counted. When the counted number becomes more than a predetermined tolerable bit error number, a signal representing the non-coincidence between the input and predetermined coded signals is obtained at a signal line 508 connected to the counter 56.

Figure 2:
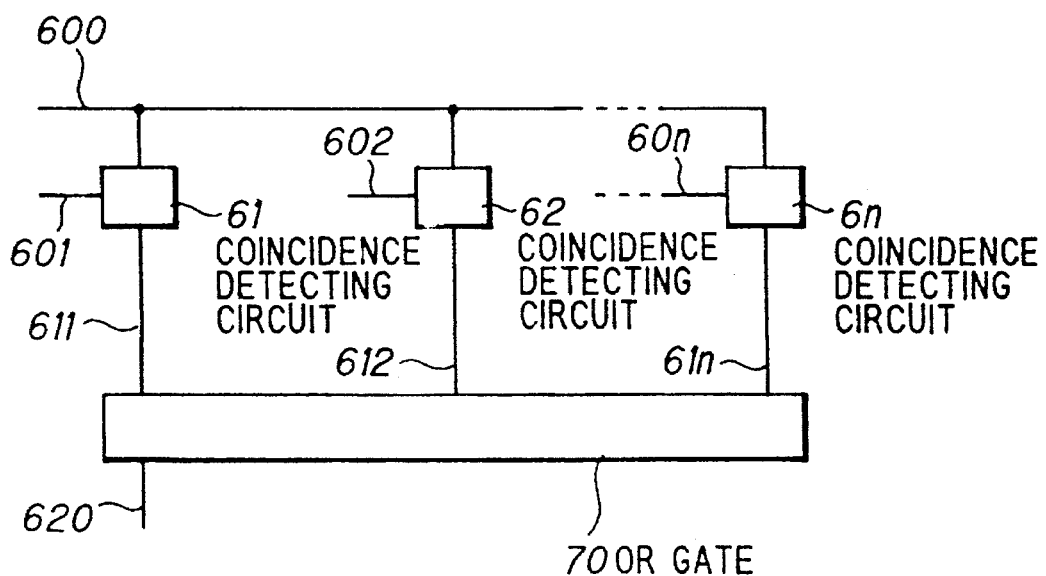

FIG. 2 shows the latter conventional system which includes a predetermined number of coincidence detecting circuits 61, 62, - - - 6n, and an OR circuit 70. The predetermined number is equal to the number of signals which can possibly be coded by a tolerable number of bit errors.

In operation, an input coded signal is supplied via a signal line 600 to the coincidence detecting circuits 61, 62, - - - 6n, and each possible error coded signal which contains a number of errors which is not greater than the tolerable number of error bits as well as a completely correct coded signal are respectively supplied via signal lines 601, 602, - - - 60n to the coincidence detecting circuits 61, 62, - - - 6n.

In one of the coincidence circuits 61, 62, - - - 6n, a coincidence signal is generated when the input coded signal coincides with one of the coded signals supplied via the signal lines 601, 602, - - - 60n. The coincidence signal is supplied via one of signal lines 611, 612, - - - 61n to the OR gate 70 and obtained at an output signal line 620 connected to the OR gate 70. Accordingly, a coincidence only occurs when the number of error bits in the input coded signal is less than the tolerable number.

Next, a system for detecting non-coincidence of codes in a preferred embodiment according to the invention will be explained in FIGS. 3 to 6.

Figure 3:
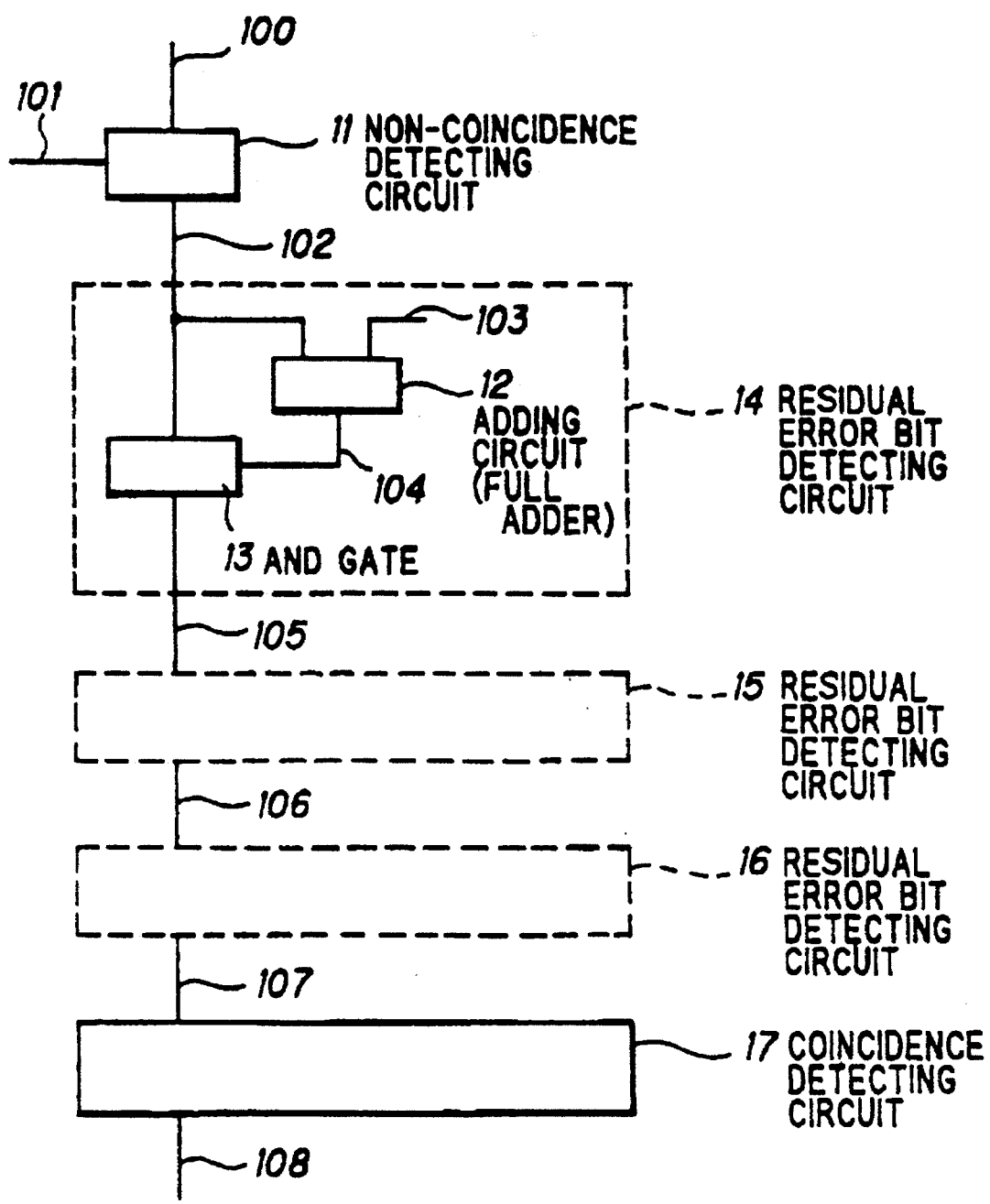
FIG. 3 is a block diagram showing a system for detecting non-coincidence of codes in a preferred embodiment according to the invention.

FIG. 3 shows the system for detecting non-coincidence of codes which comprises a non-coincidence detecting circuit 11 for comparing corresponding bits between an input coded signal on a signal line 100 and a predetermined coded signal on a signal line 101 and for providing the results of such comparison on a signal line 102 The system also comprises a first to third residual error bit detecting circuits 14 to 16 connected in series by signal lines 105 and 106 wherein each residual error bit detecting circuit 14 to 16 detects residual error bits in the comparison results and each decrease the residual error bits by one bit. The system also includes a coincidence detecting circuit 17 for detecting the coincidence between the input coded signal and the predetermined coded signal to provide a coincidence signal on a signal line 108 by detecting the non-existence of an error bit supplied on a signal line 107 from the third residual error bit detecting circuit 16.

Figure 4:
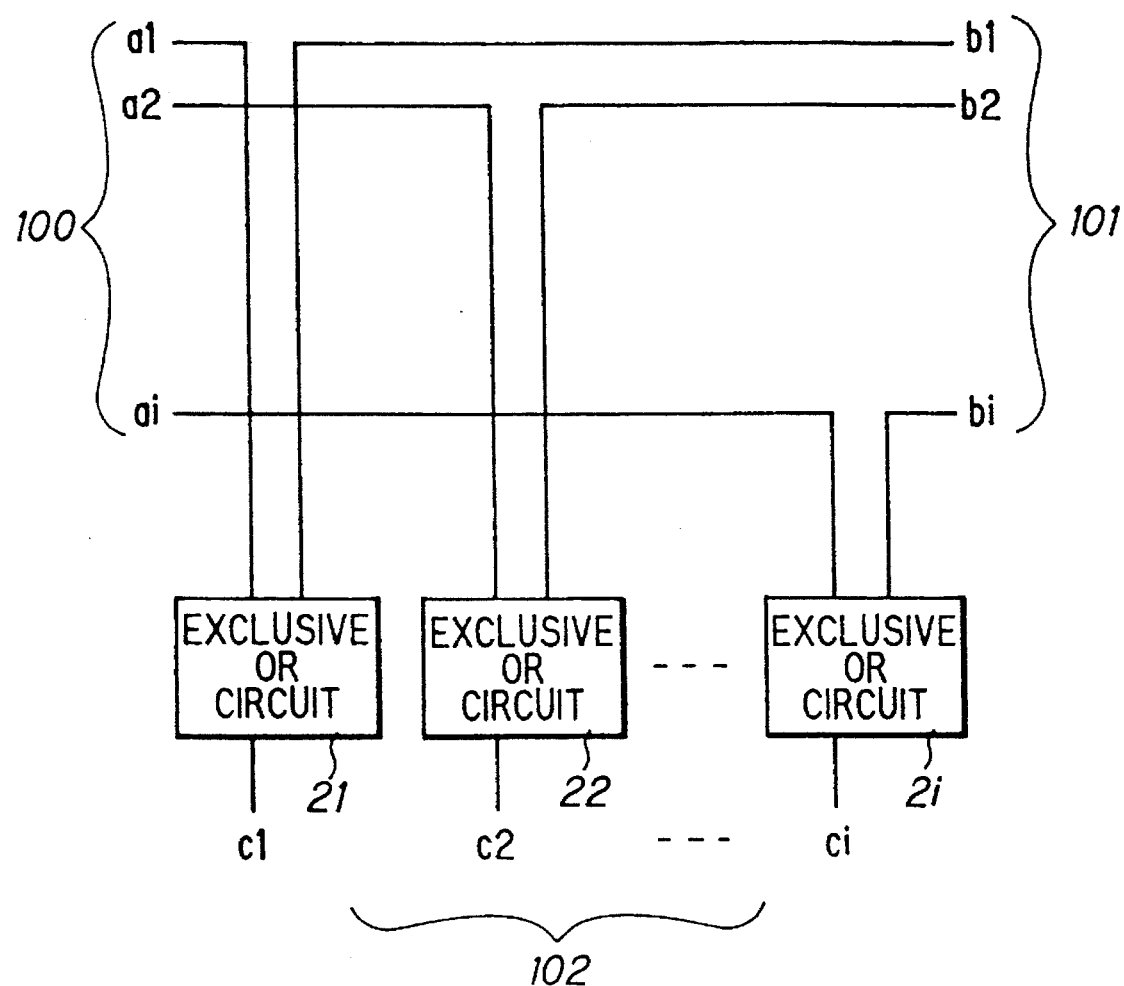
FIG. 4 is a block diagram showing a non-coincidence detecting circuit in the preferred embodiment.

FIG. 4 shows the non-coincidence detecting circuit 11 which includes exclusive OR circuits 21, 22, - - - 2i having first inputs connected to the signal line 100 for the input coded signal a1, a2, - - - ai, second inputs connected to the signal line 101 for the predetermined coded signal b1, b2, - - - bi, and outputs connected to the signal line 102 for a non-coincidence signal composed of the coincidence results c1, c2, ci.

Figure 5:
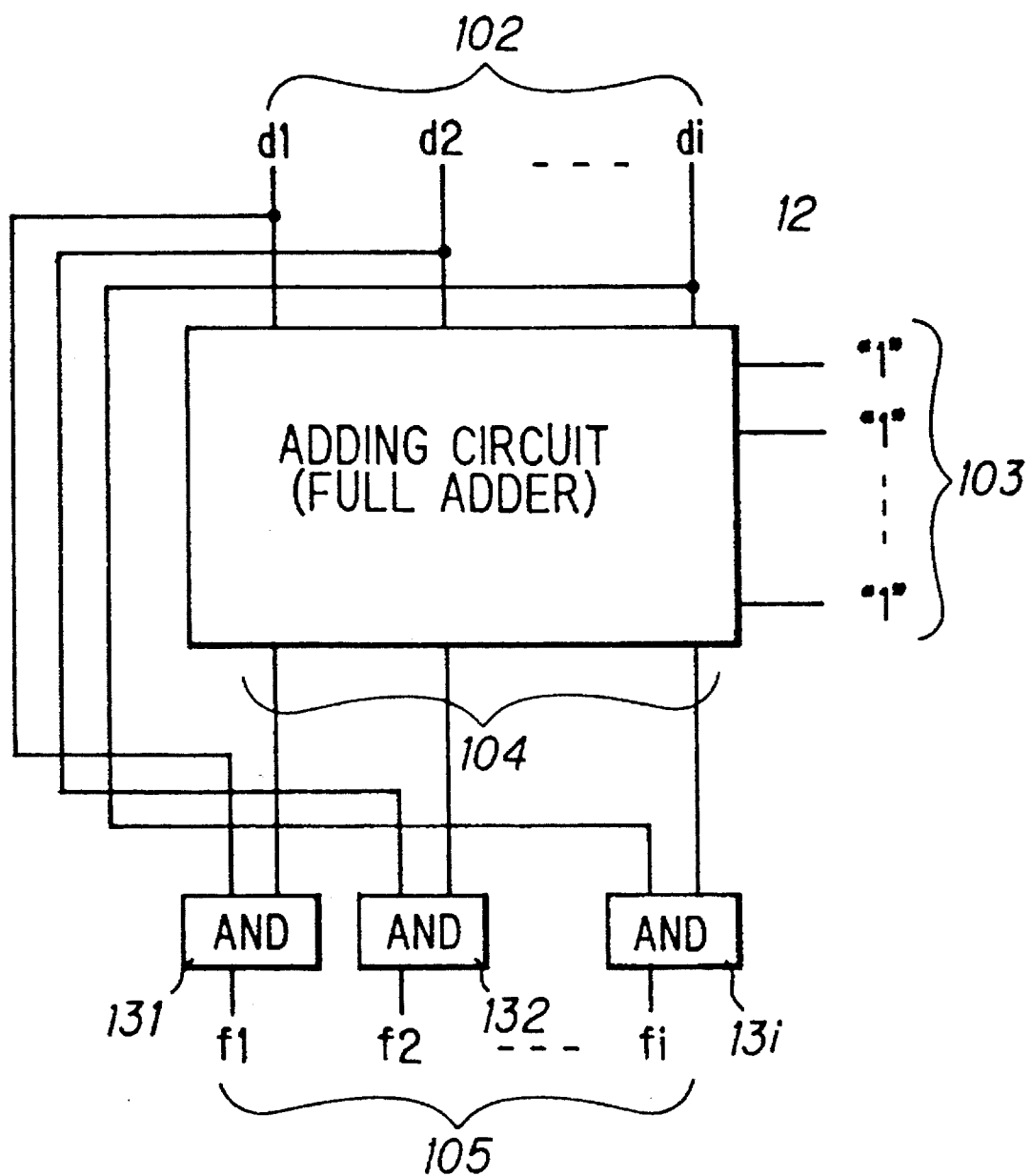
FIG. 5 is a block diagram showing a circuit for detecting residual error bits in the preferred embodiment.

FIG. 5 shows the first residual error bit detecting circuit 14 which includes an adding circuit (full adder) 12 for adding the non-coincidence signal d1, d2, - - - di (equal to c1, c2, ci) and a signal of "1" in all i bits supplied on a signal line 103, and AND gates 131, 132, - - - 13i having first inputs connected to the signal line 102, second inputs connected to outputs of the adding circuit 12, and outputs connected to the signal line 105. In the adding circuit 12, a carry signal is added to the next significant bit in the ordinary manner, and a carry signal obtained at the MSB is ignored. The second and third residual error bit detecting circuits 15 and are the same in construction as the first residual error bit detecting circuit 14.

Figure 6:
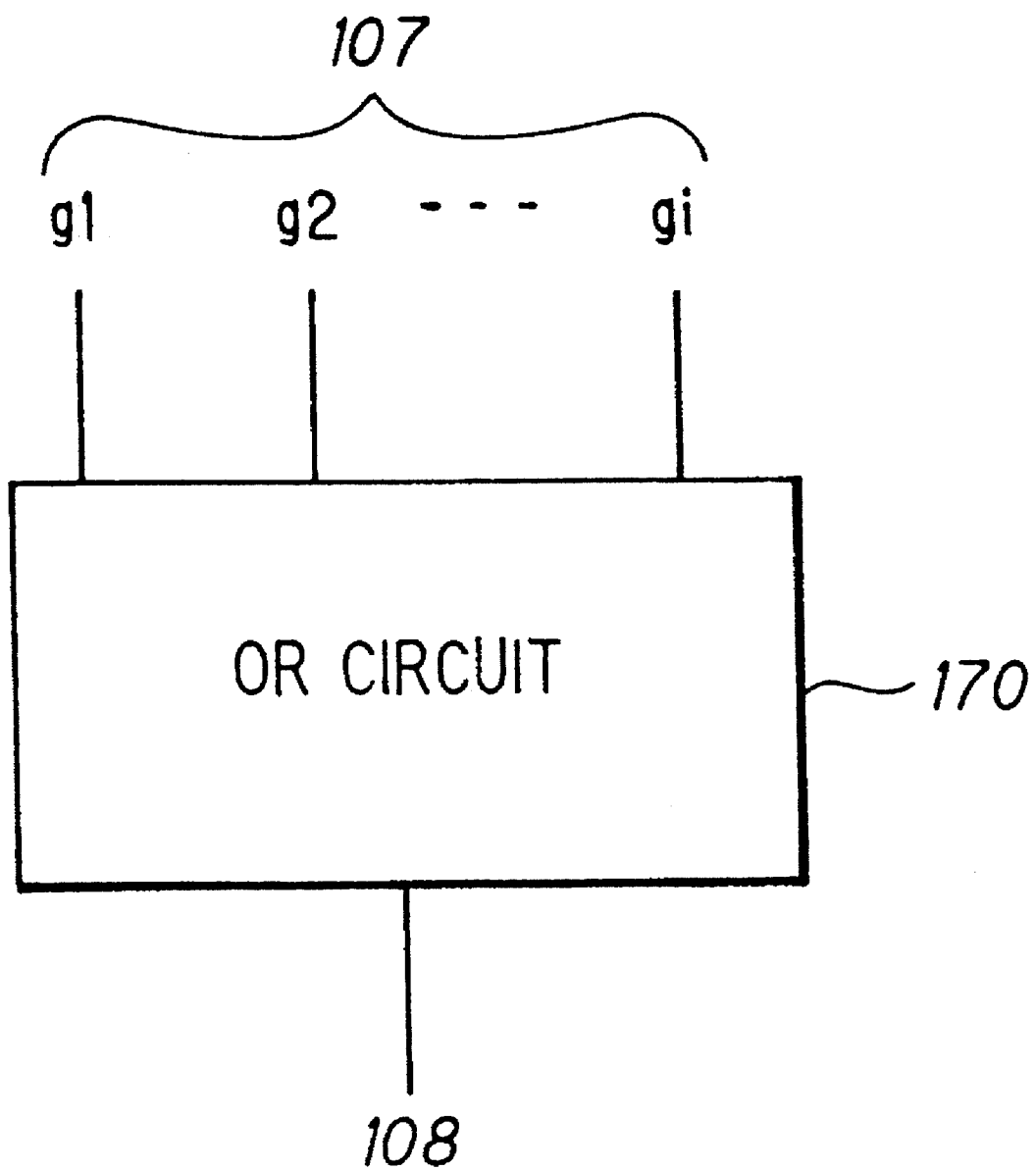
FIG. 6 is a block diagram showing a circuit for detecting coincidence between an input coded signal and a predetermined coded signal in the preferred embodiment.

FIG. 6 shows the coincidence detecting circuit 17 which includes an OR circuit 170 having inputs connected to the signal line 107 for a residual error bit-decreased signal g1, g2, - - - gi and an output connected to the signal line 108. The operation of the system will be described below.

In operation, it is assumed that the tolerable number for error bits is three, that the input coded signal is "10010000", and the predetermined coded signal is "10100001" (i=8).

First, the signal "10010000" (a1, a2, - - - ai) is supplied via the signal line 100 to the first inputs of exclusive OR circuits 21, 22, - - - 2i in the non-coincidence detecting circuit 11, and the signal "10100001" (b1, b2, - - - bi) is supplied via the signal line 101 to the second inputs of the exclusive OR circuits 21, 22, - - - 2i. As a result, the non-coincidence signal "00110001" (c1, c2, ci) representing the existence of three bit errors is obtained on the signal line 102 from outputs of the exclusive OR circuits 21, 22, - - - 2i.

Second, the non-coincidence signal "00110001" (d1, d2, - - - di) and the adding signal "11111111" are added in the adding circuit 12 in the first residual error bit detecting circuit 14. As a result, an added signal "00110000" is obtained on the signal line 104 from the outputs of the adding circuit 12. Subsequently, the added signal "00110000" thus obtained and the non-coincidence signal "00110001" (d1, d2, di) are supplied to the AND gates 131, 132, - - - 13i in the first residual error bit detecting circuit 14, so a one error bit decreased signal "00110000" (f1, f2, fi) is obtained on the signal line 105 from the outputs of the AND gates 131, 132, 13i.

The process in the first residual error bit detecting circuit 14, in which the number of error bits in the non-coincidence signal is decreased by one bit, is subsequently carried out in the second and third residual error bit detecting circuits 15 and 16. Consequently, a non-coincidence signal "00100000" is obtained on the signal line 106 from outputs of AND gates (not shown) in the second residual error bit detecting circuit 15, and a non-coincidence signal "00000000" is obtained on the signal line 107 from outputs of AND gates (not shown) in the third residual error bit detecting circuit 16.

Finally, the non-coincidence signal "00000000" is supplied from the third residual error bit detecting circuit 16 to the OR circuit 170 in the coincidence detecting circuit 17, so that a high level signal representing the coincidence between the input coded signal "10010000" and the predetermined coded signal "10100001" is obtained on the signal line 108 from an output of the coincidence detecting circuit 17.

On the other hand, if an input coded signal (a1, a2, - - - ai) includes a greater number of error bits than the tolerable number, (i.e., three in the preferred embodiment), the coincidence detecting circuit 17 generates a low level signal.

In general, the tolerable number is two or three when an input coded signal is of 32 bits, and it is zero or one when the input coded signal is 16 bits.

Figure 7:
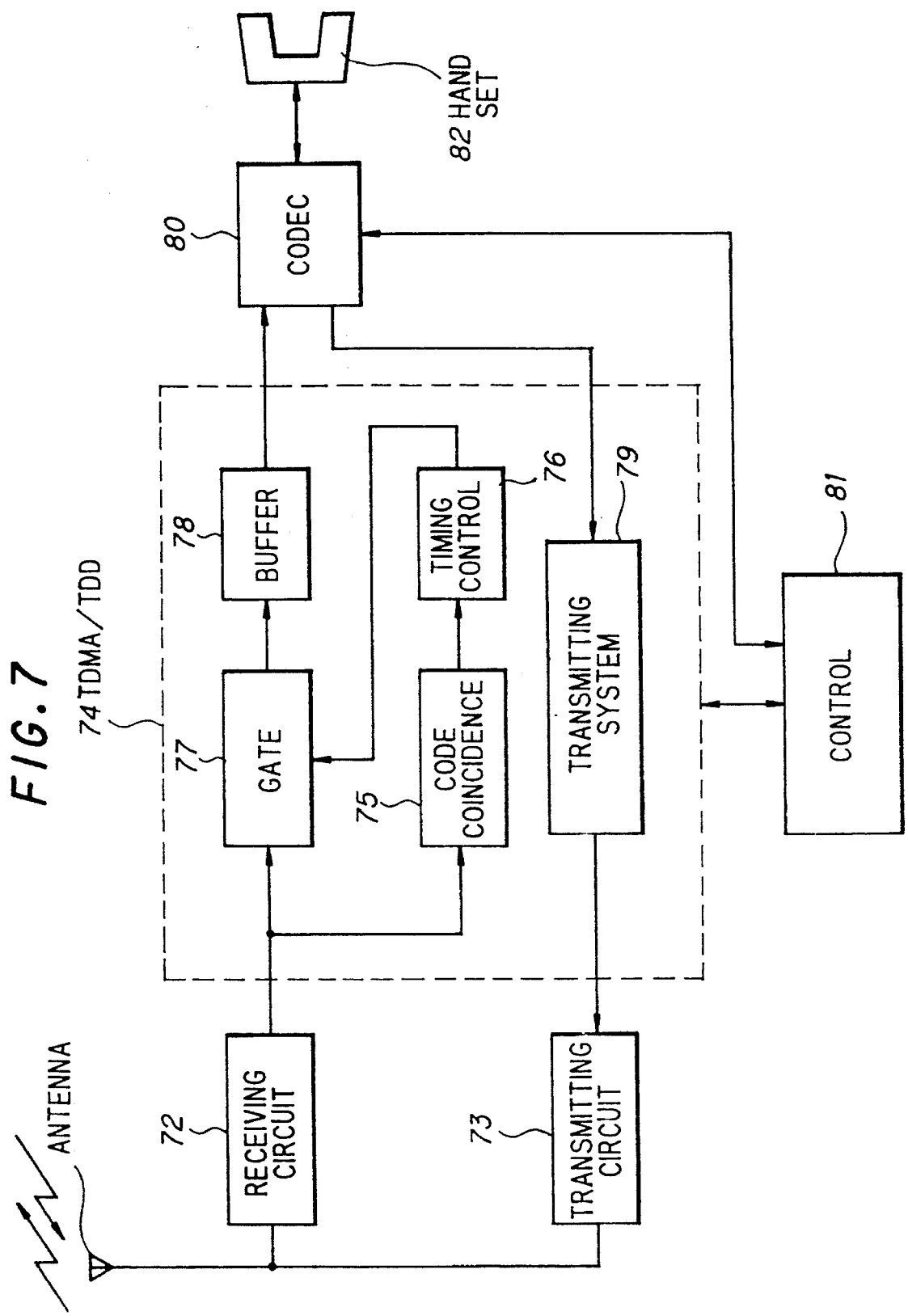
FIG. 7 is a block diagram showing a cordless telephone system in which the invention is included.

FIG. 7 shows a cordless telephone set system in which a system for detecting non-coincidence of codes is included in accordance with the invention. The cordless telephone set system includes an antenna 71 for receiving and transmitting radio signals, a radio receiving circuit 72 for amplifying and demodulating the received radio signal, a radio transmitting circuit 73 for amplifying and modulating the transmitting radio signal, a TDMA/TDD (time division multiplexing access/time division duplex) unit 74, a codec 80 for decoding the received radio signal and encoding the transmitting radio signal, a control unit 81 for controlling the TDMA/TDD unit 74 and the codec 80, and a handset 82 having a microphone and a phone-receiver for an operator. The TDMA/TDD unit 74 includes a code coincidence circuit 75 for generating a code coincidence signal by using the system for detecting non-coincidence of codes in the aforementioned preferred embodiment, a timing control circuit 76 for generating a timing signal by receiving the coincidence signal, a gate 77 which is turned on by receiving the timing signal, a buffer circuit 78 for storing the received signal, and a transmitting system 77 for supplying coded signals to the transmitting circuit 73 at predetermined timings.

Figure 8:
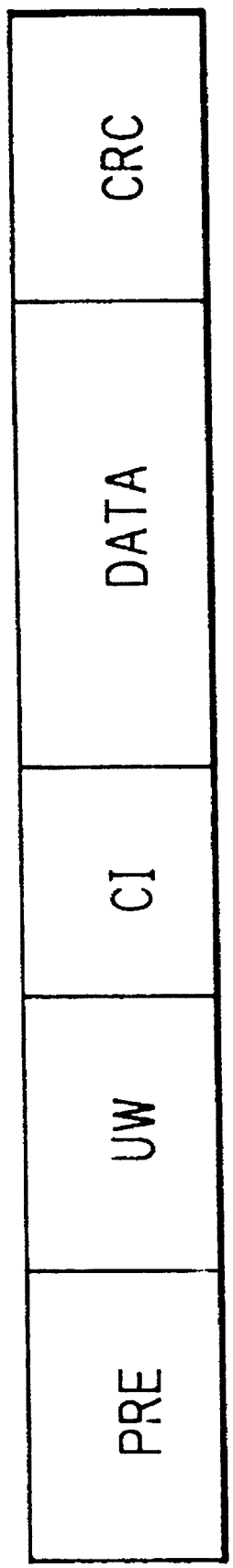
FIG. 8 is an explanatory diagram showing a coded signal used in the cordless telephone system.

FIG. 8 shows one example of a received or transmitting signal including PRE(preamble), UW(unique word), CI(channel identifier), DATA, and CRC(cyclic redundancy code), wherein the UW is a code for timing which is checked in accordance with the coincidence and non-coincidence of a predetermined coded signal. The structure of two typical received or transmitting signals is set out below.

In operation, the received radio signal is demodulated in the receiving circuit 72, and the demodulated signal is checked to determine whether the UW coincides with a predetermined coded signal, as explained in the aforementioned preferred embodiment. When the coincidence signal is generated from the code coincidence circuit 75, the timing control circuit 76 controls the gate 77 to be turned on at a predetermined timing, so that the demodulated signal is passed through the gate 77 to be stored in the buffer circuit 78. Then, the buffer circuit 78 is controlled by the control unit 81 so that a signal read from the buffer circuit 78 is supplied to the codec 80. Subsequently, the supplied signal is decoded in the codec 80. Thus, an operator can receive voice information based on the decoded signal by using the handset 82.

Although the invention has been described with respect to specific embodiment for complete and clear disclosure, the appended claims are not to be thus limited but are to be construed as embodying all modifications and alternative constructions that may occur to one skilled in the art which fairly fall within the basic teaching herein set forth.

What is claimed is:

1. A system for detecting non-coincidence of codes, comprising:

means for comparing an input coded signal and a predetermined coded signal to generate a non-coincidence signal including correct and error bits;

means for changing said error bits to correct bits in said non-coincidence signal by a predetermined number of bits, thereby generating an error bit decreased signal; and means for detecting non-coincidence between said input coded signal and said predetermined coded signal by checking for an existence of an error bit in said error bit decreased signal.

2. A system for detecting non-coincidence of codes, according to claim 1, wherein:

said changing means comprises:
   a predetermined number of residual error bit detecting circuits, each of said residual error bit detecting circuits changing one of said error bits to a correct bit.

3. A system for detecting non-coincidence of codes, comprising:

means for comparing an input coded signal and a predetermined coded signal to generate a non-coincidence signal including correct and error bits;

means for changing said error bits to correct bits in said non-coincidence signal by a predetermined number of bits, thereby generating an error bit decreased signal; and means for detecting non-coincidence between said input coded signal and said predetermined coded signal by checking for an existence of an error bit in said error bit decreased signal, wherein said changing means comprises:
   a predetermined number of residual error bit detecting circuits, each of said residual error bit detecting circuits changing one of said error bits to a correct bit, and wherein said each of said residual error bit detecting circuits comprises:
   a full adder for adding said non-coincidence signal and a signal of "1" in all bits; and
   AND gates for carrying out AND processing between corresponding bits of said non-coincidence signal and an added signal supplied from said full adder.

4. A system for detecting non-coincidence of codes, comprising:

a non-coincidence detecting circuit for comparing corresponding bits of an input coded signal and a reference coded signal to generate a coded signal having correct bits and error bits;

a predetermined number of residual error bit detecting circuits, wherein a first one of said residual error bit detecting circuits is supplied at input terminals with said coded signal having correct bits and error bits, wherein input terminals of a subsequent one of said residual error bit detecting circuits are connected to output terminals of said first one of said residual error bit detecting circuits, wherein said predetermined number of said residual error bit detecting circuits are equal to a tolerable number of said error bits included in said input coded signal, and wherein one of said error bits is converted to a correct bit in each of said residual error bit detecting circuits; and a coincidence detecting circuit for detecting an error bit in a coded signal supplied from output terminals of a last one of said residual-error bit detecting circuits, wherein said coincidence detecting circuit determines that said input coded signal has error bits equal to or less than said tolerable number when said coincidence detecting circuit detects no error bits.

5. A system for detecting non-coincidence of codes, according to claim 2, wherein said predetermined number of bits changed by said changing means is equal to said predetermined number of residual error bit detecting circuits means.

\* \* \* \* \*

UNITED STATES PATENT AND TRADEMARK OFFICE
CERTIFICATE OF CORRECTION

PATENT NO.   : 5,463,645
DATED        : October 31, 1995
INVENTOR(S)  : Noriaki NAGASHIMA It is certified that error(s) appears in the above-identified patent and that said Letters Patent is hereby corrected as shown below:

Col. 2, line 3, delete "cods" and insert --codes--.

Col. 3, line 66, after "c2" insert -- -- --.

Col. 4, line 3, after "c2" insert -- --- --.

Col. 4, line 10, after "15 and" insert --16--.

Col. 4, line 27, after "c2" insert -- --- --.

Col. 4, line 38, after "d2" insert -- --- --.

Col. 4, line 41, after "f2" insert -- --- --.

Col. 4, line 43, after "132" insert -- --- --.

Signed and Sealed this

Twenty-first Day of May, 1996

*Attest:*

BRUCE LEHMAN

*Attesting Officer*   *Commissioner of Patents and Trademarks*